Jan. 21, 1969 M. LIPKIN 3,423,121
PROTECTIVE PARTITION AGAINST DECELERATION
Filed Feb. 10, 1967 Sheet 1 of 2
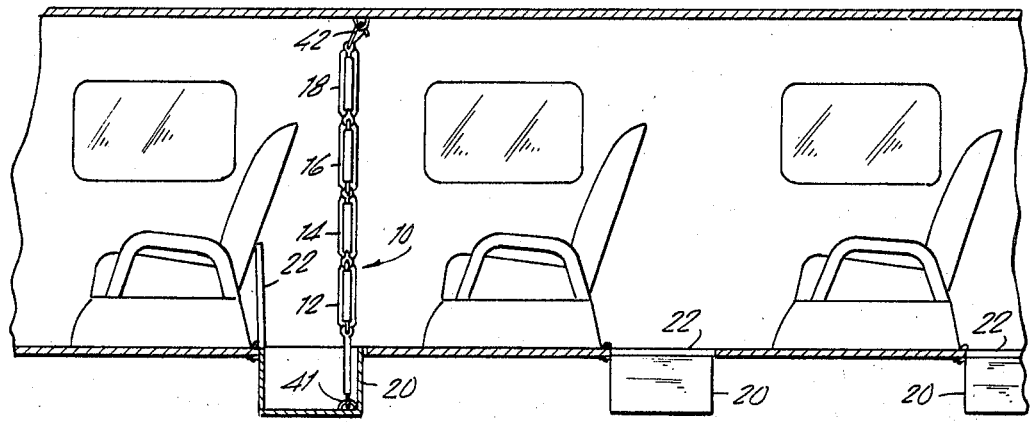
FIG. 1
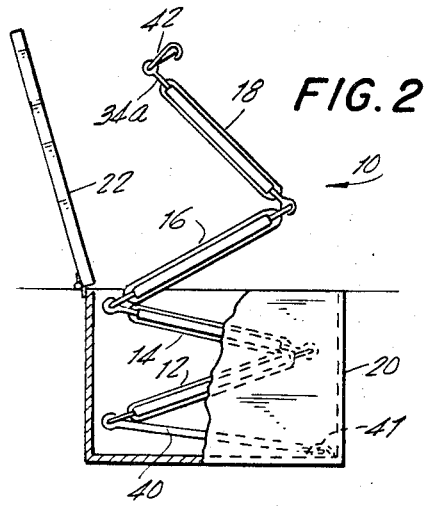
FIG. 2
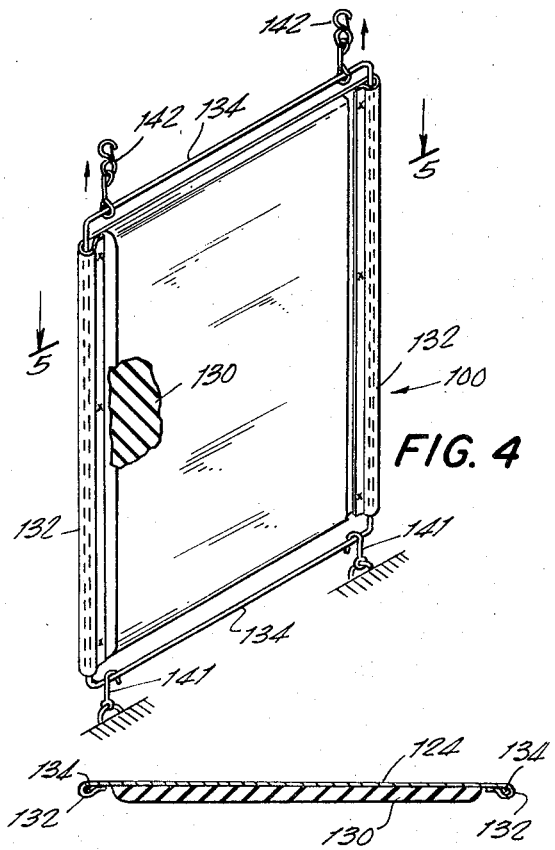
FIG. 4
FIG. 5
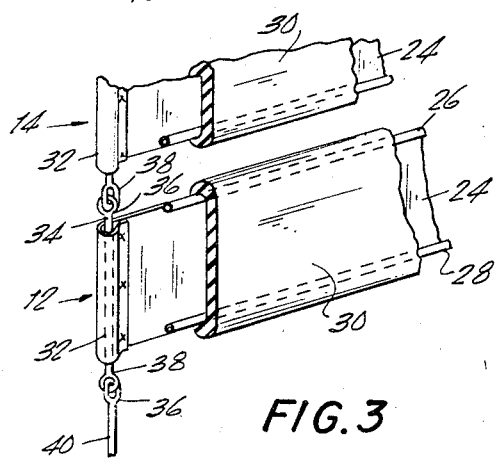
FIG. 3
INVENTOR.
MARTIN LIPKIN
BY
*[signature]*
ATTORNEY

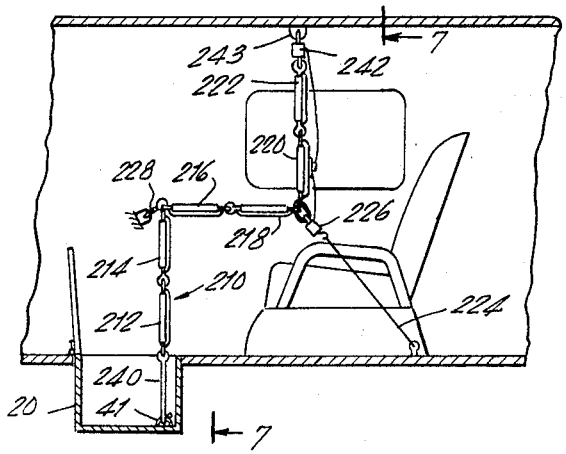
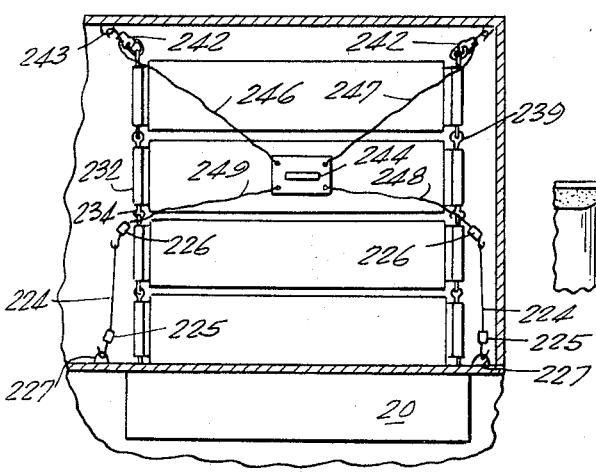
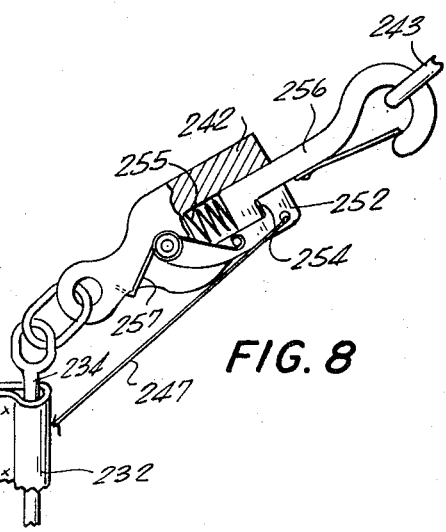
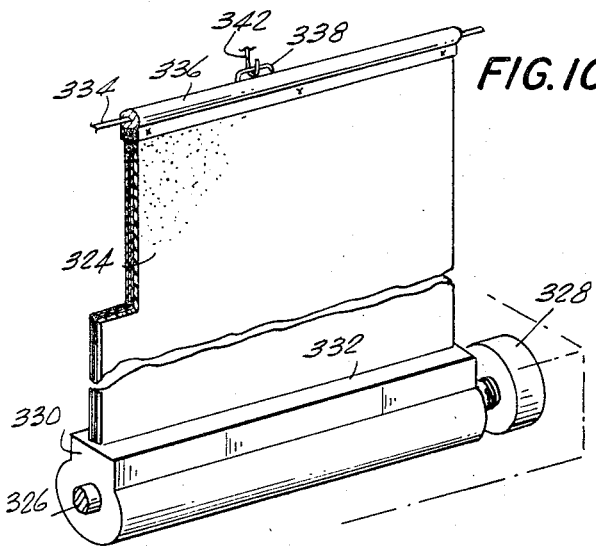
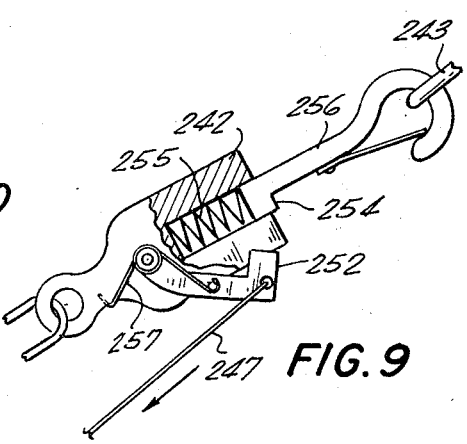

United States Patent Office 3,423,121
Patented Jan. 21, 1969

3,423,121
PROTECTIVE PARTITION AGAINST DECELERATION
Martin Lipkin, 445 E. 86th St., New York, N.Y. 10028
Filed Feb. 10, 1967, Ser. No. 615,254
U.S. Cl. 296—24                                      8 Claims
Int. Cl. B60r 21/02

ABSTRACT OF THE DISCLOSURE

A device for passenger protection in rapidly moving vehicles, such as in the cabins of aircraft, or high speed trains, to prevent the passenger from being injured, lacerated or dismembered during rapid deceleration. A partition or shield is provided which is capable of suffering irreversible stretching and taking on a permanent set or deformed state upon impact against the shield by the passenger to be protected. The energy of the impact is absorbed by the work done in permanently deforming the material of the shield-partition. The partition is padded on the passenger side and foldable into a storage box under the floor level of the cabin of the aircraft or other vehicle but may be readily unfolded so that it is suspended from the cabin framework at the top and the floor of the storage box at the bottom. The body of the barrier within the padding of foam rubber or plastic is preferably made of a special alloy steel, known per se, which has a high product of yield-point stress times elongation-at-rupture, and which therefore is maximally energy-absorbing upon impact. According to a further embodiment, the barrier comprises a plurality of layers of the above-mentioned special alloy steel material, padded with plastic foam padding and permanently or temporarily suspended from the floor and ceiling of the vehicle. According to a further embodiment, the partition is made in a plurality of linked sections or portions having one end linked to the floor of the storage box and the other end linked to the ceiling of the cabin, and intermediate portions of the hinged partition extending over the lap and close to the chest of the passenger, and a passenger-operated trigger mechanism is provided for rapidly releasing the barrier device so that it does not block the passenger's exit. According to a further embodiment, the partition, comprising a plurality of layers of deformable energy-absorbing material is stored on a roll beneath floor level and may be unrolled therefrom to form a partition whose top end is suspended from the roof framework of the vehicle.

According to the invention, a non-resilient partition, or plurality of linked sections forming a shield or partition, provided with padding on at least one side thereof, is removably or permanently located in front of the passenger seat, so that it is in the path of the passenger and would be contacted by him with minimum motion of the partition in the event of a crash or rapid deceleration. The material of the partition or barrier, or of each linked section thereof, comprises one or more layers of sheet material, or closely woven energy-absorbing material capable of being deformed and taking on a permanent set in order to absorb the energy of the shock of deceleration; additionally, padding is provided to decrease the possibility of surface abrasions and bruising, which might occur when the passenger comes in contact with the partition. The padding is preferably foamed plastic or buffering material which is capable of stretching when the shield or partition is deformed. The minimum thickness of the sheet forming the body of the partition, or section, is so designed that it will remain unruptured on impact by a 200-pound body travelling at 150 m.p.h. The partition is designed to deform permanently under such impact load and to deform considerably without rupturing, so as to absorb the energy of impact. The barrier is attachable, e.g. by means of hooks at the corners, to suitable fastening means provided on the vehicle or frame of the cabin, or the device may be permanently fastened into place.

Among the advantages of the invention is the fact that it is quickly attachable into place, if indeed it is not permanently fastened. The barrier is more securely supported by the frame structure of the vehicle, and not merely by the back of the seat ahead of the passenger. It involves no inflatable devices and hence requires no inflation sources, but can be used as a strong back-up for inflatable cushioning devices. It allows only a minimum of motion and provides a broad area for bodily contact to minimize local injury.

The above-mentioned objects, features and advantages of the present invention will be more fully apparent from the following description, taken in conjunction with the accompanying drawings, in which:

FIG. 1 is an elevation cross-section view of the interior of the cabin of an aircraft or high speed train in which one embodiment of the invention, foldable for storage, is illustrated;

FIG. 2 is an enlarged view of the storage compartment of the embodiment of FIG. 1, with the foldable partition shown partially collapsed in the storage container;

FIG. 3 is a fragmentary detail view, in perspective, partially cut away to show the construction, of the partition of FIGS. 1 and 2;

FIG. 4 is a perspective view of another embodiment of the invention;

FIG. 5 is a horizontal cross-section taken along the plane of line 5—5 of FIG. 4;

FIG. 6 is an elevational cross-sectional view of the cabin of an aircraft or high speed train, illustrating the installation of another embodiment of the invention;

FIG. 7 is a view taken generally along the planes of lines 7—7 of FIG. 6 and thus shows the passenger's-eye view of the partition.

FIG. 8 is an enlarged detail elevation view of the hook fastening device of FIG. 7, shown in closed position;

FIG. 9 is the hook device of FIG. 8, shown in open position;

FIG. 10 is a perspective view of a further embodiment of the invention.

In the first embodiment, illustrated in FIGS. 1, 2 and 3, the deformable partition, designated generally by the numeral 10, comprises a plurality of linked sections 12, 14, 16, 18. A storage compartment 20, having a hinged top 22 is provided for each of the partitions 10. The individual sections 12, 14, 16, 18, as best shown in FIG. 3, each comprises a sheet 24 of deformable energy-absorbing material having a relatively high product of yield-point stress times elongation at rupture, The upper and lower edges of the sheet 24 may be rolled as shown in FIG. 3 to eliminate sharp edges. Foamed rubber or plastic padding 30 is provided covering the sheet 24, at least on the passenger side of each of the sections 12, 14, 16, 18 of the partition 10. The lateral ends of the sheet 24 are rolled back and spot welded to the main sheet 24 so as to form tubular ends 32 extending vertically. Linking means, such as bars 34 extend vertically through the tubes 32 and are each provided at one end with an eye 36, and at the other end thereof with an eye-engaging member 38.

As best shown in FIG. 2, the linking means 34 permit the sections 12, 14, 16, 18 to fold relative to one another so that the device 10 can be stowed in the storage box 20. The linking means includes a bottom fastening bar 40 at each lateral side which links the bar 34 of the lowermost section 12 at 41 to the floor or other surface of the storage box 20. Fastening means 42, such as a detachable hook, link the uppermost bar 34A (FIG. 2) of the uppermost section 18 to suitable attaching points on the frame of the vehicle.

Among the types of material which may be used for the sheets 24, may be a chrominum-nickel type steel, for example austenitic stainless steel designated number 201 by Allegheny Ludlum Steel Corporation which has the following mechanical properties in the heat treated condition: Yield strength (p.s.i.), 35,000–180,000; elongation (percent in 2 inches, min.), 40.0.

Of course, it will be understood that other materials and other ranges of properties may be selected in order to accomplish the purpose of my invention, as above described. Furthermore, instead of a solid sheet of material as shown at 24 in FIG. 3, woven mesh or perforated material may be used. However, when mesh or netting is used, the openings therein should preferably be smaller than about one inch width in order to prevent cutting or laceration upon impact, and the material should be of the properties mentioned above, namely a high product of yield-point stress times elongation-at-rupture, and which is therefore maximally energy absorbent upon impact.

In the embodiment of FIGS. 4 and 5, the partition barrier designated generally by the numeral 100 in non-foldable and comprises a sheet of material 124, which may be of the same types of material above described relative to FIGS. 1–3. Foamed rubber or plastic padding 130 may be affixed to the passenger side of the sheet 124, for example with adhesive. The lateral edges are rolled into tubes 132, 132 and are spot-welded to the main body of the sheet. A supporting bar or cable 134 extends through the tubes 132, 132 and surrounds the partition 100 to support the latter. Fastening means, such as hooks 141, 141 engageable with the lower support member 134 hold the partition member 100 from the bottom, and other fastening means, such as hooks 142, 142, engageable with the upper horizontal portion of the bar or cable 134 to support the partition 100 from above.

It is understood of course, that the overall height of the partitions 10 or 100 may vary, as desired, and need not extend completely to the roof of the cabin.

In the embodiment of FIGS. 6 and 7, the shield or crash barrier generally designated at 210 is constructed somewhat similar to the embodiment of FIGS. 1–3 in that it has a plurality of linked sections 212, 214, 216, 218, 220, 222. A connecting link 240 fastens the lowermost section 212 to a hinged point 41 at the bottom of the storage box 20. Similarly linking means or bars having an eye at one end and eye engaging means at the other extend through the tubular lateral sides of the deformable metallic members. In this embodiment, however, the sections 216 and 218, for added safety, extend close to the lap of the passenger, and extend in a horizontal manner, while the portion 220 extends closer to the chest and torso of the passenger in seated position than with the corresponding sections 16, 18 of the embodiment of FIG. 1. In order to properly support the device of FIGS. 6 and 7, the linking means include cables 224 attached at the bottom by hooks 225 to permanent fixtures 227 mounted on the floor or other rigid structure of the vehicle; and attached at the top by hooks 226, 226 to the eye portions or eye-engaging portions of the linking bars 234. The joint between the sections 214 and 216 is also similarly supported from the frame (not shown) of the vehicle by means of a hook 228 (FIG. 6) on the wall side and a similar hook and a floor-attached cable (not shown) on the aisle side.

A trigger mechanism is provided in the device of FIGS. 6 and 7 to rapidly release the barrier 210 for egress of the passenger. When the partition 210 is in position as shown in FIGS. 6 and 7, the linking bars 234 support the device from fastening means which include hooks 242 adapted to engage fixtures 243 firmly affixed to the frame of the vehicle. As best shown in FIGS. 8 and 9, the hooks 242 and the similar hooks 226 (FIGS. 6 and 7) are capable of being moved into a locked condition (FIG. 8) or a released condition (FIG. 9), the latter occurring when the rapid-release handle 244 is pulled by the seated passenger, which places a tension on the normally slack connecting cables 246, 247, 248, 249. The hooks 226 and 242 have a similar construction, as illustrated in FIGS. 8 and 9. Each of the trigger cables 246, 247, 248, 249 is attached at one end to the pull handle 244 and at the other end to a latch 252 which engages a detent 254 of a sliding portion 256 inserted into the main body of the fastening means 242. The latch 252 is normally spring biased by spring 257 so that the latch normally engages the detent 254 to keep the sliding member 256 within the bore of its housing. A compression spring 255 urges the shaft of the slidable portion outwardly of its housing.

Operation of the trigger mechanism is as follows. When the passenger pulls on the handle 244, the normally slack cables 246, 247, 248, 249 are tightened against their respective latches 252 to disengage the latter from the corresponding detent 254 and thus release each slidable portion 256 from its housing in the bore of the main body of the fastening hook 242 or 226. With the fastening means 242 detached from the fixtures 243, and the similar hooks 226 likewise detached from the cables 224, the device 210 no longer forms an obstruction to the egress of the passenger from his seat.

In the embodiment of FIG. 10, one or more thin sheets of deformable material 324, without the padding, is attached at its lower edge to a horizontal rotatable shaft 326. A pulley 328 may be affixed at one end of the shaft 326 to facilitate rotation thereof for winding up the sheet 324 onto the shaft 326. The rotatable shaft 326 together with its end bearings is mounted below floor level and may be provided with a housing 330 which forms a slot 332, preferably surrounded by a rubber gasket (not shown) around the slot at floor level. The sheet 324 issues from a slot at floor level. Its upper end is provided with rigidifying means, such as a bar 334 with a surrounding tube 336 affixed such as by spot welding, to the upper edge of the sheet 324, and is provided with one or more handles 338 engageable with corresponding vehicle-mounted hooks or other fastening means 342.

In operation, the device of FIG. 10 operates as follows. The tube 336 is manually pulled upward to unroll the sheet 324 until the handle or handles 338 engage the hook or hooks for suspending the deformable sheet 324 in the desired position.

It will be obvious to those skilled in the art, upon studying this disclosure, that this invention permits of various modifications and alterations with respect to the individual components and arrangements disclosed, and hence can be embodied in shock absorbing shields or barriers other than as particularly illustrated and described herein, without departing from the essential features of the invention and within the spirit and scope of the claims annexed hereto.

I claim:
1. A protective shock absorbing device for passengers in the event of rapid vehicle deceleration, comprising, in combination with a vehicle, a member capable of being permanently deformed upon impact therewith by the passenger under rapid deceleration of the vehicle, said member being of a material capable of absorbing a substantial portion of the energy of the impact, said material having a relatively high product of yield-point stress time elongation-at-rupture, and means for strengthening the edges of said member, and means connected thereto for fastening said members to the vehicle.

2. A device according to claim 1, said member comprising a plurality of deformable metallic sheets, linking means at the lateral ends of said sheets so as to render the sheets foldable alternately relative to one another, and storage container means for receiving said sheets in folded condition.

3. A device according to claim 2, said plurality of metallic sheets each having upper and lower rolled edges and formed tubular lateral sides, said linking means extending through said tubular lateral sides and including suspension bars having an eye at one end thereof and eye engaging means at the other end thereof.

4. A device according to claim 1, said member comprising at least one solid sheet of material.

5. A device according to claim 1, including a rapid-release device for disconnecting said fastening means upon actuation of said rapid-release device by the passenger.

6. A device according to claim 5, said rapid-release device comprising a trigger mechanism, said fastening means including a plurality of hooks movable into closed and open conditions, said trigger mechanism having a release member and connecting means joining said release member with said hooks for causing said hooks to move into their open conditions upon manual actuation of said release member.

7. A device according to claim 1, said member comprising at least one permanently deformable metallic sheet, storage container means having a rotatable shaft affixed to one end of said sheet for holding said one end of said sheet in the storage container in rolled and unrolled condition, and means fixed to the other end of said sheet for engaging said fastening means.

8. A device according to claim 6, said fastening means comprising a main body having a bore, a hook member having one end slidable into said bore and provided with a detent, a latch member hingedly mounted on said main body and biased to normally engage said detent when said hook member is in position in said bore, and flexible means connecting aid release member with said latch for disengaging the latter from said detent to permit separation of said hook member from said main body.

References Cited

UNITED STATES PATENTS 2,884,279    4/1959    Halstead _____ 296—24

FOREIGN PATENTS 37,087    1/1927    Denmark.
1,257,096    2/1961    France.

PHILIP GOODMAN, *Primary Examiner.*

U.S. Cl. XR.

244—121; 280—150